US012566456B1

(12) United States Patent
Sankhe et al.

(10) Patent No.: US 12,566,456 B1
(45) Date of Patent: Mar. 3, 2026

(54) METHOD AND SYSTEM FOR NAVIGATING AN UNMANNED VEHICLE IN A SOLAR PLANT

(71) Applicant: Terrawise Inc., Dover, DE (US)

(72) Inventors: Dhruva Sankhe, Westlake Village, CA (US); Parth Sankhe, Mumbai (IN); Rishi Sankhe, Mumbai (IN); Girish Chowdhary, Champaign, IL (US)

(73) Assignee: TERRAWISE INC., Dover, DE (US)

( * ) Notice: Subject to any disclaimer, the term of this patent is extended or adjusted under 35 U.S.C. 154(b) by 0 days.

(21) Appl. No.: 19/316,346

(22) Filed: Sep. 2, 2025

(30) Foreign Application Priority Data

Aug. 30, 2024　(IN) .............................. 202411065781

(51) Int. Cl.
| | |
|---|---|
| *G05D 1/646* | (2024.01) |
| *G05D 1/248* | (2024.01) |
| *G06T 7/00* | (2017.01) |
| *G05D 101/15* | (2024.01) |
| *G05D 105/80* | (2024.01) |
| *G05D 109/10* | (2024.01) |
| *G05D 111/10* | (2024.01) |

(52) U.S. Cl.
CPC ............. *G05D 1/646* (2024.01); *G05D 1/248* (2024.01); *G06T 7/001* (2013.01); *G05D 2101/15* (2024.01); *G05D 2105/89* (2024.01); *G05D 2109/10* (2024.01); *G05D 2111/10* (2024.01); *G06T 2207/20081* (2013.01); *G06T 2207/30252* (2013.01)

(58) Field of Classification Search
CPC .... G05D 1/646; G05D 1/248; G05D 2101/15; G05D 2109/10; G06T 7/001
See application file for complete search history.

(56) References Cited

U.S. PATENT DOCUMENTS

| | | | |
|---|---|---|---|
| 12,377,946 B1 * | 8/2025 | Todter ...................... | G05D 1/48 |
| 2016/0111006 A1 * | 4/2016 | Srivastava ............... | G05D 1/00 |
| | | | 701/3 |
| 2019/0031344 A1 * | 1/2019 | Hitchcock .............. | B64U 10/13 |
| 2023/0153989 A1 * | 5/2023 | Ryan ....................... | G06T 7/001 |
| | | | 382/149 |

FOREIGN PATENT DOCUMENTS

| | | |
|---|---|---|
| KR | 20180082166 A | 7/2018 |
| KR | 20200048615 A | 5/2020 |

\* cited by examiner

*Primary Examiner* — Tan Q Nguyen
(74) *Attorney, Agent, or Firm* — Jason A. Smith; Shumaker, Loop & Kendrick, LLP

(57) ABSTRACT

A method for navigating an unmanned vehicle in a solar plant. According to the method, inspection data and inspection instruction of the solar plant is received. Further the unmanned vehicle is navigated based on the inspection instruction and the inspection data. To navigate the unmanned vehicle, a coarse location of the unmanned vehicle is determined. Further, a fine location of the unmanned vehicle based on image data and the coarse location is determined. Furthermore, a route for the unmanned vehicle based on the fine location, the inspection data, and the inspection instruction, is determined and the unmanned vehicle is manoeuvred based on the fine location of the unmanned vehicle and the route.

20 Claims, 5 Drawing Sheets

400

402

Receiving captured images from image sensors on the unmanned vehicle.

404

Transmitting the received data to an onboard processor.

406

Processes the received data and transmitting to a navigation system.

408

Receiving the processed data and generating one or more commands.

410

Sending the one or more commands to a processor responsible for steering the robot.

500

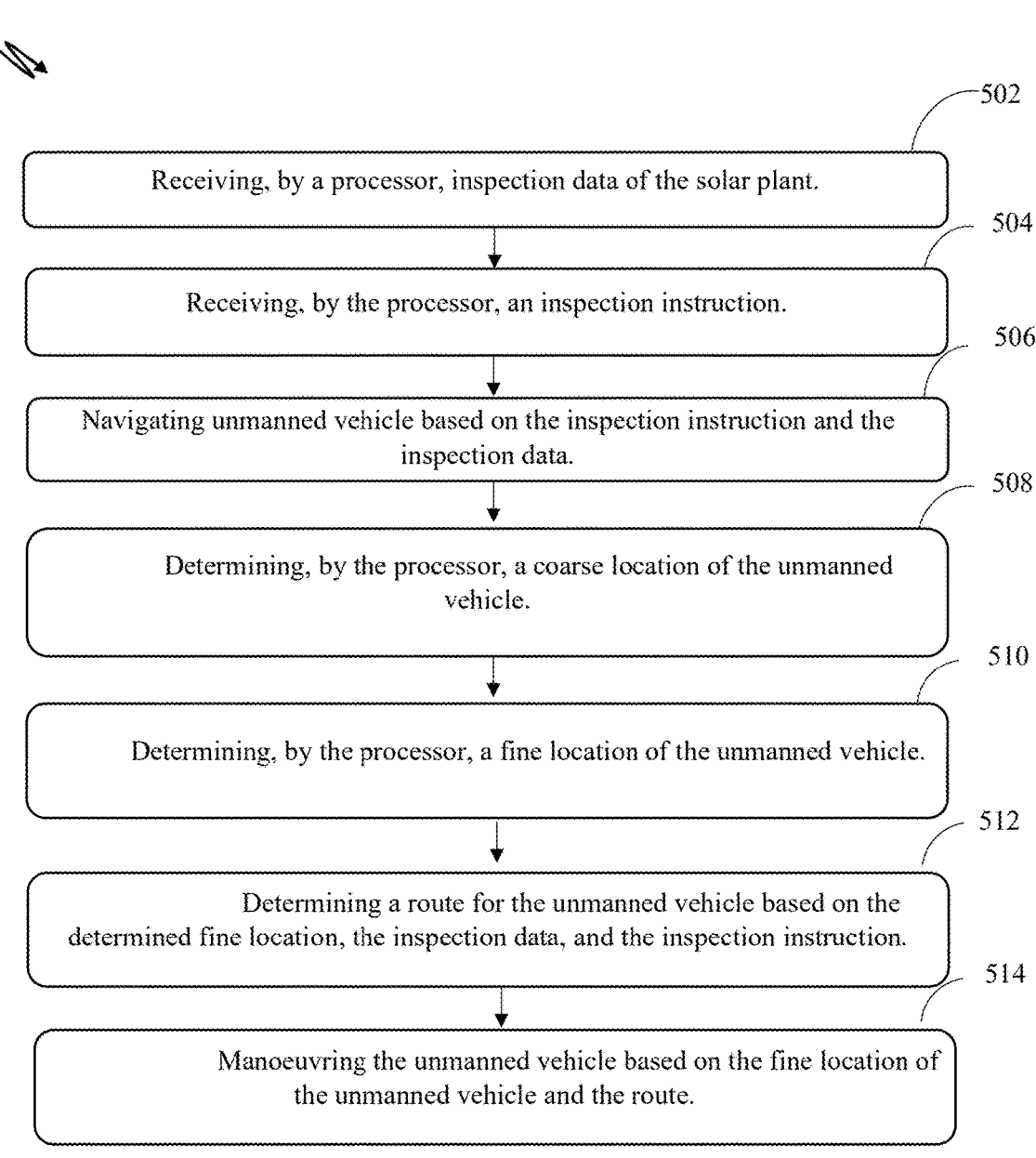

502

Receiving, by a processor, inspection data of the solar plant.

504

Receiving, by the processor, an inspection instruction.

506

Navigating unmanned vehicle based on the inspection instruction and the inspection data.

508

Determining, by the processor, a coarse location of the unmanned vehicle.

510

Determining, by the processor, a fine location of the unmanned vehicle.

512

Determining a route for the unmanned vehicle based on the determined fine location, the inspection data, and the inspection instruction.

514

Manoeuvring the unmanned vehicle based on the fine location of the unmanned vehicle and the route.

Figure 5

METHOD AND SYSTEM FOR NAVIGATING AN UNMANNED VEHICLE IN A SOLAR PLANT

PRIORITY INFORMATION

The present application claims priority from Indian Patent Application number 202411065781 filed on Aug. 30, 2024.

TECHNICAL FIELD

The present subject matter described herein, in general, relates to a system and a method for navigating an unmanned vehicle in a solar plant.

BACKGROUND

A solar plant comprises numerous distinct components, each serving a specific function and existing in various forms. Optimal efficiency of the solar plant requires all components to be in good working condition, as any damage to a single part can disrupt the overall operation and/or output. Each component operates in a unique environment and is susceptible to specific types of damage or defect. Conducting manual inspections for each diverse type of solar plant component is a labour-intensive, time-consuming, error prone, and challenging. However, the solar plants are generally spanned over extensive area which add an additional layer of complexity for navigation. Thus, the extensive coverage of solar plants poses a challenge for automatic navigation and inspection.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for navigating an unmanned vehicle in a solar plant in order to detect defects in one or more components of the solar plant. This summary is not intended to identify essential features of the claimed subject matter nor is it intended for use in determining or limiting the scope of the claimed subject matter.

In one implementation, a method for navigating an unmanned vehicle in a solar plant is disclosed. The method comprises receiving inspection data of the solar plant. The inspection data includes at least one of a map of the solar plant, one or more components of the solar plant, and maintenance history of the solar plant. The method further comprises receiving an inspection instruction. The inspection instruction includes information corresponding to at least one of an area in the map of the solar plant, and a component from the one or more components of the solar plant. Further, the unmanned vehicle is navigated based on the inspection instruction and the inspection data. The navigating comprises determining a coarse location of the unmanned vehicle based on Global Positioning System (GPS) data. Further a fine location of the unmanned vehicle is determined based on image data and the coarse location. Furthermore, a route for the unmanned vehicle is determined based on the fine location, the inspection data, and the inspection instruction. Finally, the unmanned vehicle is manoeuvred based on the fine location of the unmanned vehicle and the route.

In an embodiment, the method comprises capturing one or more images of at least one of the one or more components and surrounding of the unmanned vehicle based on the inspection instruction using a sensor positioning mechanism.

In an embodiment, the method comprises detecting defects in the at least one of the one or more components of the solar plant by analysing the one or more images using one or more image processing techniques.

In an embodiment, the method comprises generating an inspection report comprising at least one of the detected defects in one of the one or more components of the solar plant, one or more defective components associated with the detected defect in the solar plant, and corresponding location of the one or more defective components in the solar plant.

In an embodiment, a sensor positioning mechanism analyses the captured one or more images to determine a quality of the one or more captured images based on a training dataset comprising a plurality of inspection instructions, corresponding set of images, and a quality of images from the set of images.

In an embodiment, the sensor positioning mechanism controls at least one of the unmanned vehicle and a sensor mounted on the unmanned vehicle to re-capture one or more images of the one or more components for inspection based on the quality of the one or more images.

In an embodiment, the inspection instruction comprises a level of inspection, and wherein the level of inspection is one of a low inspection, a medium inspection, and a high inspection.

In an embodiment, the fine location is determined using a machine learning model, and wherein the machine learning model is trained to detect one or more components surrounding the unmanned vehicle based on the inspection data and image data of the one or more components surrounding the unmanned vehicle.

In an embodiment, the route for the unmanned vehicle comprises one or more checkpoints through the driving path in the solar plant, and wherein the route begins from the fine location of the unmanned vehicle and ends at a location determined based on the inspection instruction.

In another implementation, a system for navigating an unmanned vehicle in a solar plant is disclosed. The system comprises a memory and a processor communicatively coupled to the memory. The processor may execute one or more instructions stored in the memory to receive inspection data of the solar plant. The inspection data includes at least one of a map of the solar plant, one or more components of the solar plant, and maintenance history of the solar plant. Further an inspection instruction is received. The inspection instruction includes information corresponding to at least one of an area in the map of the solar plant, and a component from the one or more components of the solar plant. Further, the unmanned vehicle is navigated based on the inspection instruction and the inspection data. The navigating comprises determining a coarse location of the unmanned vehicle based on Global Positioning System (GPS) data. Further a fine location of the unmanned vehicle is determined based on image data and the coarse location. Furthermore, a route for the unmanned vehicle is determined based on the fine location, the inspection data, and the inspection instruction. Finally, the unmanned vehicle is manoeuvred based on the fine location of the unmanned vehicle and the route.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for navigating an unmanned vehicle in a solar plant is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

FIG. 5 illustrates a method for navigating an unmanned vehicle, by an onboard processor, in a solar plant, in accordance with an embodiment of the present subject matter.

Figure 1:
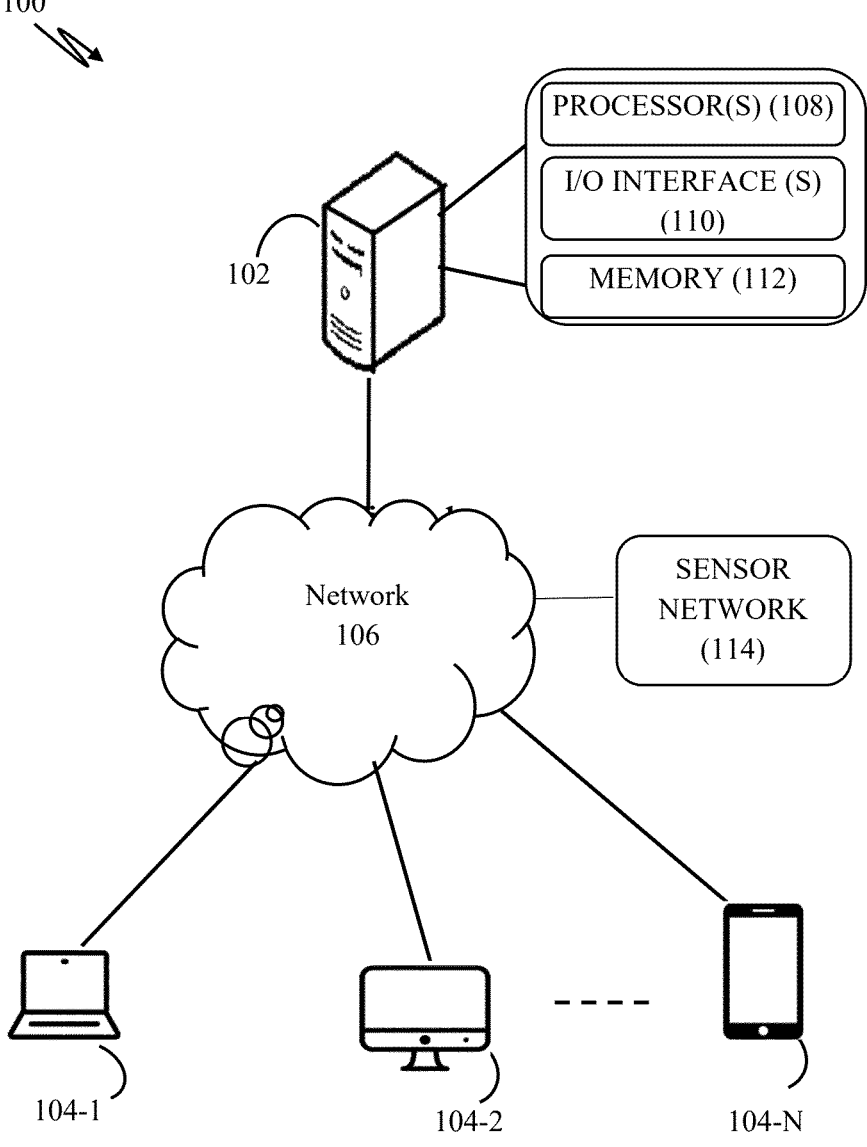
FIG. 1 illustrates a network implementation for navigating an unmanned vehicle in a solar plant, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "navigating," "determining," "manoeuvring," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment are readily apparent to those skilled in the art and the generic principles herein may be applied to other embodiments. However, one of ordinary skill in the art may be readily recognize that the present disclosure is not intended to be limited to the embodiments described but is to be accorded the widest scope consistent with the principles and features described herein.

The present subject matter discloses a method and a system for navigating an unmanned vehicle in a solar plant. The unmanned vehicle may be navigated through the solar plant to detect defects in the solar plant. The defects may correspond to an anomaly in various components of the solar plant namely, a photovoltaic module, a combiner box, a transformer, solar panel, support structures, wires/connectors, an inverter, and the like. The goal of the invention is to navigate the unmanned vehicle and identify defects in the solar plant. Certain technical challenges exist for achieving the goal of navigating the unmanned vehicle and detecting defects. Manually checking the solar plant presents a technological difficulty because it is typically dispersed over huge areas and has many components. Moreover, navigating an unmanned vehicle accurately in these huge areas proposes another technical challenge. Further, finding defects in the solar plant takes longer when inspecting such a plant by manually. For operators of solar plants, delays in defect detection can result in large losses. A reduced percentage yield (actual yield/theoretical yield*100) dropping below 100, for example, indicates a possible production shortfall when not all solar panels are operating at their maximum efficiency. Several problems and defects may cause this deficiency. The solar plant may have defects in one or more of its components. Combiner boxes, for instance, act as the points where strings from solar panel rows join to direct the output towards the inverter. Overheating and the development of hotspots are frequent occurrences in such an arrangement. It is impossible to visually identify heat anomalies, as inspecting these boxes is difficult. Unfortunately, this means that component defects go undiscovered for long stretches of time, and doing inspections manually is time-consuming and dangerous. Furthermore, the reliance on meteorological factors introduces complication because unfavourable weather might interfere with inspection procedures and endanger inspectors' safety.

To address these challenge, present method and system have been described, which allows navigation of an unmanned vehicle in the solar plant to inspect combiner boxes, detect faults within combiner boxes, inspect soiled or damaged panels, detect improper stringing of diverse solar modules, the presence of overgrown grass under the solar panels, defects due to environmental factors and the like. The timely inspection not only enhances the efficiency of power output of a solar plant but also reduces energy losses attributable to these defects. The solution presented by the embodiments disclosed herein to address the above challenge is through navigating an unmanned vehicle to the respective defective component and analysing images of the component using machine leaning techniques, to detect the defects.

Referring to FIG. 1, a network implementation 100 of a system 102 for navigating an unmanned vehicle in solar plants and detecting defects within the solar plant is disclosed. Initially, the system 102 receives inspection instruction and inspection data, of a solar plant to navigate the unmanned vehicle. The system may receive the inspection instruction and inspection data via a graphical user interface (GUI). The unmanned vehicle may be a drone, ground-based robot, rover, or any other automated, semi-automated, remotely controlled system capable of navigating within the solar plant. In an example, a user may use an application installed on a user device 104-1 having the GUI to input the inspection instruction and inspection data. It may be noted that the one or more users may access the system 102 through one or more user devices 104-1, 104-2 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In an embodiment, the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the user devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, the system 102 may receive data from a sensor network 114. The sensor network may include camera sensors (like RGB cameras for capturing standard images, RGB-D (depth) cameras for depth perception, and thermal cameras for temperature-related information), inertial sensors, LIDAR, location sensors, and the like installed on the unmanned vehicle. In an embodiment, the unmanned vehicle may be configured to install or uninstall one or more sensor based on the nature of component to be inspected.

As there are various challenges observed in the existing art, the challenges necessitate the need to build the system 102 for navigating the unmanned vehicle in the solar plant and detecting defects within the solar plant. In an embodiment a user may use the user devices 104 to access the system 102 via the I/O interface 110. The user may register the user devices 104 using the I/O interface 110 in order to access the system 102. In one aspect, the user may access the I/O interface 110 of the system 102. The detail functioning of the system 102 is described below with the help of figures.

The system 102 as described herein is configured to execute a set of instructions for navigation of the unmanned vehicle in the solar plant. In an embodiment, to navigate the unmanned vehicle, the system 102, via the processor 108, may receive inspection data of the solar plant. The inspection data may include at least one of a map of the solar plant, the one or more components of the solar plant, and maintenance history of the solar plant. For instance, having a detailed map of the solar plant aids in identifying specific locations of the one or more components in the solar plant. The map of the solar plant may include at least one of a boundary (like perimeter) of the solar plant, a label (like name or identification number) of the one or more components in the solar plant, a location of the one or more components in the solar plant, a driving path in the solar plant, and one or more obstacles present in the solar plant.

The inspection data may include information associated with the one or more components of the solar plant. for example, name of the component, identifier associated with the component, location of the component, total number of components in the solar plan. As, discussed above, the inspection data may include maintenance history. The maintenance history indicates regrading health of a component, like date and time of last inspection of the component, information related to sub-components defective in the component, information related to sub-components heathy in the component, information related to sub-components replaced in the component, and the like. Thus, in order to inspect the solar plant for detecting defects, the inspection data may help navigate the unmanned vehicle in the solar plant.

In an embodiment, the system 102 may receive, via the processor 108, an inspection instruction. The inspection instruction may include specific information corresponding to at least one of an area in the received map of the solar plant, and a component from the one or more components of the solar plant. For example, as in practical scenarios the solar plants are spanned over wide areas, therefore it becomes crucial to receive information regarding a particular area of the solar plant and a specific component of the large number of components that needs to be inspected. To this end, in an embodiment, the system may receive inspection instructions directing the unmanned vehicle to focus on an area for example, southwestern region in the solar plant map. In yet another embodiment, the inspection instruction may direct towards a specific component having an ID-C1 like a combiner box to conduct a thorough inspection of the combiner box residing in the southwestern region of the solar plant.

In an embodiment, the inspection instruction comprises a level of inspection to be conducted. The level of inspection may refer to how comprehensive or extensive the inspection or examination needs to be. It may denote the extent of specificity, close scrutiny, or all-encompassing analysis that the inspection procedure is anticipated to encompass. In an embodiment, the level of inspection may be one of a low inspection, a medium inspection, and a high inspection. For example, in an embodiment, during routine monitoring, the level of inspection included in the inspection instructions may be low inspection. The system may perform a low-level inspection, focusing on basic checks such as overall system status and general performance. This may be suitable for regular, less critical assessments. In yet another example, in the event of a monthly or quarterly evaluation, a medium inspection may be carried out. This entails a closer inspection of individual components or parts of the components. For example, the effectiveness of solar panels and the operation of crucial components like inverters may be investigated. In yet another embodiment, the high inspection may be necessary during a critical or annual system evaluation. In order to guarantee optimal performance and spot any problems, this level entails a thorough inspection of every component, including a detailed investigation of each solar panel, each combiner box, and every electrical connection, and the like.

Figure 2:
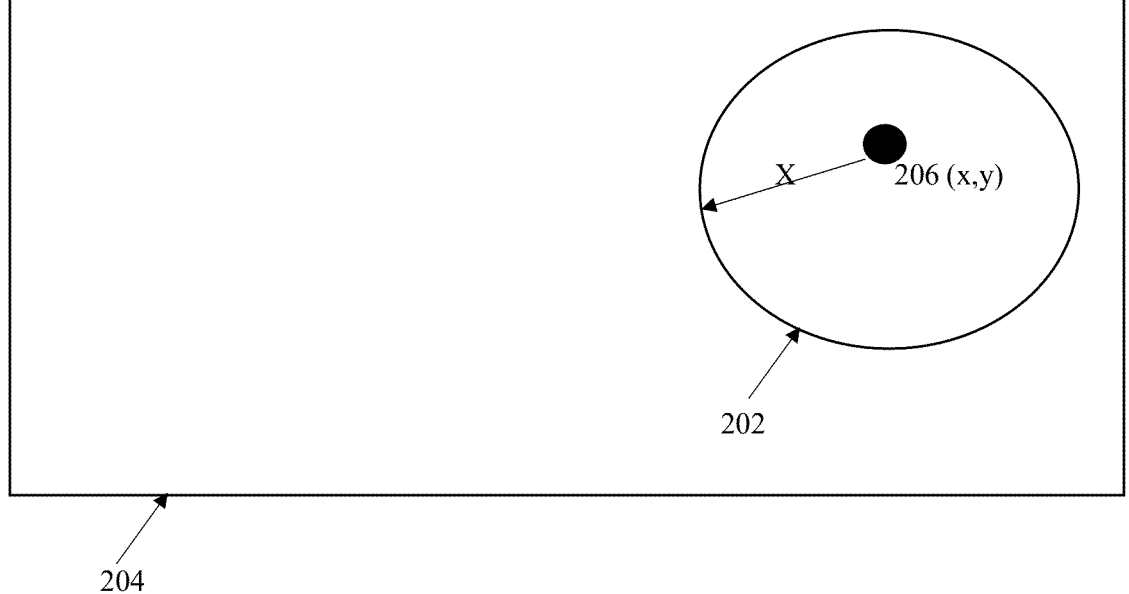
FIG. 2 illustrates fine location and coarse location, in accordance with an embodiment of the present subject matter.

In an embodiment, the system is configured to navigate, via the processor, the unmanned vehicle based on received inspection instruction and the inspection data. The unmanned vehicle may be integrated with a navigation and positioning system ensuring precise movement and coverage of the unmanned vehicle in the solar plant. For example, Global Positioning System (GPS), LiDAR, or other positioning technologies may be employed for accurate navigation. To navigate the unmanned vehicle, the system is configured to determine, by the processor, a coarse location of the unmanned vehicle. The coarse location 202 (referring to FIG. 2) may correspond to an area of the solar plant 204 in which the unmanned vehicle is present. The system may receive location coordinates using the GPS, and a Global Navigation Satellite System (GNSS), to locate the area of the unmanned vehicle in the solar plant at a given moment in time. For example, the coarse location may include a set of coordinates corresponding to the area covered within X radius from a point (x,y) in the solar plant. The area may include one or more components present around the unmanned vehicle in the solar plant.

Once the coarse location is determined, in an embodiment, the system is configured to determine a fine location of the unmanned vehicle based on image data and the determined coarse location. The fine location 206 is a more precise location and may correspond to position coordinates of the unmanned vehicle in the solar plant. For example, the fine location may correspond to the current position of the unmanned vehicle within the solar plant. The fine location may be in the form of received GPS coordinates for example, (37.7755°N, 122.4201° W). These GPS coordinates may be dynamic and change as the unmanned vehicle moves within the solar plant. To determine the fine location, the image data plays a crucial part. As the image data may include one or more images of surroundings of the unmanned vehicle. For example, the images of solar panels, support structures to the solar panels, inverters, network of cables and wires connecting the solar panels and inverters, various monitoring devices and control equipment, grass around solar panels, and the like, surrounding the unmanned vehicle. The system analyses the image data to identify where the unmanned vehicle is positioned in the solar plant. The surrounding images may be analysed using one or more techniques developed or to be developed in the future like image processing, thermal imaging, object detection, machine learning techniques and the like. For example, once the components in the surrounding images are identified, and located using object detection algorithm, a spatial analysis is done. The spatial analysis may be performed to determine the components relative positions. The system may generate a map of the solar plant, using the located components and their relative positions, that enables the position of the unmanned vehicle to be deduced from its surroundings. The unmanned vehicle's navigation system may then use the located components and their relative positions to guide the unmanned vehicle navigate within the solar plant. The located components and their relative positions may be then converted into a standardized coordinate system for interpretation and communication.

As discussed above the fine location is based on both the image data and the coarse location. In an exemplary embodiment, the fine location may be determined based on the covered area having radius X (shown in FIG. 2) and the image data like surrounding images of the unmanned vehicle in the covered area. In yet another embodiment, the fine location may be determined using a machine learning model. The machine learning model may be trained to detect one or more components surrounding the unmanned vehicle based on the inspection data and the image data. In order to train the machine learning model, a wide range of dataset may be collected. For example, a detailed map of the solar plant, layout and location of various components such as solar panels, inverters, transformers, and other infrastructure, spatial information to understand the geographical placements of components, images representing various components within the solar plant along with different lighting conditions, weather situations, and potential variations in component appearance, historical maintenance data for the solar plant and components like records of repairs, replacements, or any issues that occurred over time, data indicating components that have undergone recent maintenance or have a history of issues, age of components, and the like.

In an embodiment, the dataset maybe annotated with different components their conditions and their locations in the solar plant. The dataset may be used to train the machine learning model allowing it to learn patterns and relationships between the inspection data and the components. The machine learning model may predict the presence, condition, and location of components surrounding the unmanned vehicle by recognizing patterns and relationships learned during the training process, which in turn helps recognizing the current location of the unmanned vehicle. For example, a captured image is compared with the training dataset comprising annotated images of components having name and location. The fine location of the unmanned vehicle may be determined based on a comparing image of the captured component with the training dataset and corresponding location of the captured component in the matching image.

In an embodiment, the machine learning model may implement a feedback loop for continuous improvement, such that the machine learning model is periodically retrained with new data to adapt to changes in the solar plant.

The determination of the fine location may further be understood with the help of the following example. In this example, the system may receive the inspection instruction such that the inspection instruction includes information regarding component C. The information may include name, identifier, location of the component in the solar plant, and other features associated with the component C. The system may further determine the coarse location based on the information in the inspection instruction. The coarse location may indicate an area including components A, B, and C in the solar plant. The unmanned vehicle may capture the images surrounding the unmanned vehicle. The images captured may be analysed by the system and it may be determined that the unmanned vehicle is near component B by recognizing unique features like visual characteristics, shapes, colours, textures, or other distinguishing elements associated with component B in the image. The system may use the trained machine learning algorithm to compare recognized features with a predefined set of features associated with component B. This matching process helps the system establish a correlation between the captured images and the known characteristics of component B. Based on the identified features and their location in the images, the system determines the approximate location of the unmanned vehicle relative to component B.

Figure 3:
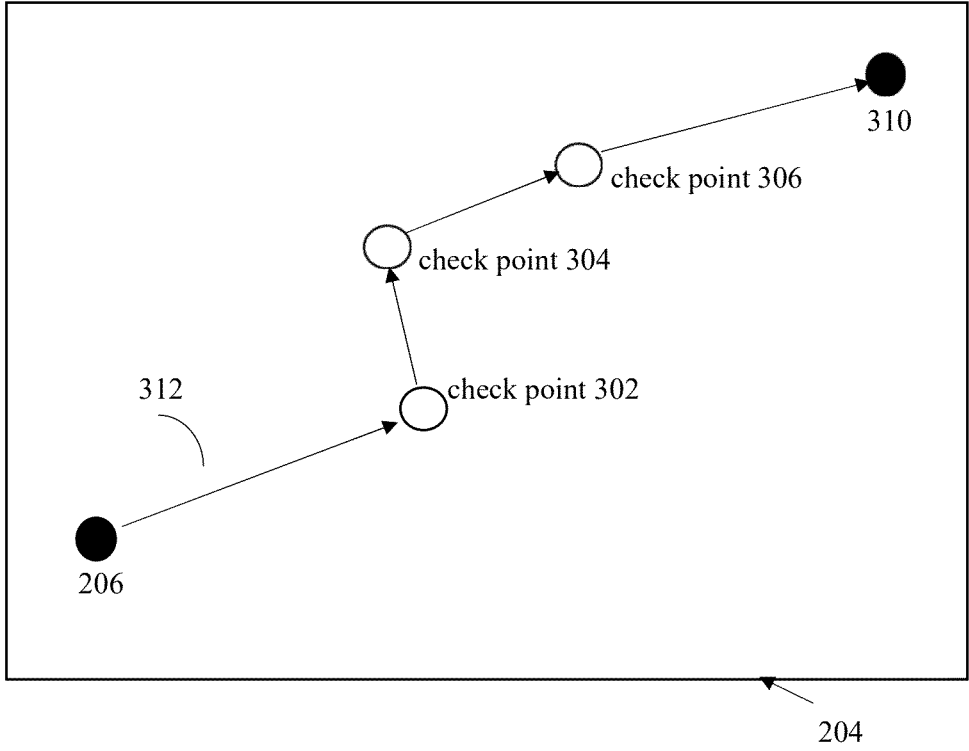
FIG. 3 illustrates fine location, a sequence of checkpoints, and a route, in accordance with an embodiment of the present subject matter.

With reference to FIG. 3, in an embodiment, the system may be configured to determine a route 312 for the unmanned vehicle based on the fine location 206, the inspection data, and the inspection instruction. For example, once the fine location of the unmanned vehicle is determined the route may be defined based on the information received by the system like the map of the solar plant, an area in the map, a particular component of the one or more components of the solar plant where the unmanned vehicle has to navigate. In an embodiment, the route 312 for the unmanned vehicle may comprise one or more checkpoints through the driving path in the solar plant. The checkpoints (302, 304, 306) may be the specific locations that the unmanned vehicle is expected to pass through. The checkpoints may be used to define the overall path and ensure that the vehicle follows the determined route. In an embodiment, the checkpoints may determine specific locations where the unmanned vehicle has to perform the inspection. In an embodiment, the checkpoints may be locations where the unmanned vehicle has to take a pause for a predetermined amount of time. In an embodiment, the checkpoints may be specific locations where the unmanned vehicle recharge batteries or refuel if the unmanned vehicle is using alternative energy sources.

In an embodiment, the route 312 may begin from the fine location 206 of the unmanned vehicle and ends at a location 310 determined based on the inspection instruction. To determine the route the inspection instruction may be analysed to identify the designated area where the inspection needs to happen on the solar plant's map. Geographical coordinates, landmarks, or other location descriptors may be used to characterise this area. In an embodiment the inspection instruction may be analysed to determine a specific component that has to be inspected. The inspection instruction may include details such as the type of component (e.g., solar panel, inverter, transformer), unique identifier associated with the component, or its spatial coordinates. In an embodiment, to determine the route 312, the system may retrieve data associated with the map of the solar plant received in the inspection data. The data may include information regarding the layout of the solar plant, spatial coordinates of different components, and their respective locations in the solar plant. The system may further combine the retrieved map data with the received inspection instructions to precisely determine the spatial location of the specified area and the targeted component within that area, which needs to be inspected. The determined area and the component information may be translated into specific spatial coordinates on the map. This may involve converting descriptive information into numerical values (latitude, longitude) that the unmanned vehicle's navigation system may understand. The system may use one or more route planning algorithms to determine an optimal path from the current location (fine location) of the unmanned vehicle to the calculated destination coordinates. The one or more route planning algorithm may consider factors such as terrain (rocky, sandy, or grassy terrains), obstacles, and one or more predefined rules for navigating within the solar plant. In an embodiment, the unmanned vehicle may be equipped with obstacle avoidance mechanisms to ensure that the unmanned vehicle may navigate safely, either by adjusting the determined route or stopping if obstacles are detected. In an embodiment, system may receive notifications, when the unmanned vehicle may be stuck due to the obstacles. In an embodiment, while navigating through the solar plant the unmanned vehicle may actively collect defect data corresponding to the condition of the one or more components of the solar plant. The collected data may be used to track health of individual components. In an embodiment, the unmanned vehicle may create a database of the collected data to indicate defects, anomalies, areas of concern, location, severity, and type of defect, and the like. The unmanned vehicle may transmit the collected defect data to the system 102 for further analysis. The unmanned vehicle may transmit the collected defect data in a periodic manner or upon occurring of an event like detection of defects. In an embodiment, the defect data may be transmitted to the user device 104 via the system 102. In an embodiment, before transmission, the system may convert the format of the defect data in a format compatible with the user device 104. To safeguard the integrity and confidentiality of the transmitted data, encryption and other security measures may be applied. The defect data may be displayed on the user device using a graphical user interface. The GUI may consist of various elements such as menus, buttons, text fields, and graphical representations to facilitate user interaction with the data. The user may interact with the displayed data through the GUI, performing actions such as browsing, searching, filtering, and analysing. In an embodiment, the user device 104 may provide feedback to the system 102 based on the received data.

In yet another embodiment, the system 102 may analyse the defect data and compute a severity level for each of the detected defects. The system may further alert a user through the user device when the severity level of the defect may be greater than a predefined threshold. The alert may be a notification comprising details such as component name, type of defect, severity level of the defect, one or more recommendations to rectify the defect, location of the component in the solar plant and the like.

In an embodiment, the system is configured to manoeuvre, via the processor, the unmanned vehicle based on the fine location of the unmanned vehicle and the route. The manoeuvring of the unmanned vehicle may include controlling movements, making adjustments to the unmanned vehicle's trajectory, like turning, changing speed, or altering altitude, or indicating directions to the unmanned vehicle. The system may determine a direction for the unmanned vehicle to begin navigation towards a checkpoint or a target location based on the fine location, a sequence of check-points, and the target location. The system may use a machine learning model to determine the direction. The machine learning model may be trained using supervised learning. The machine learning model may be trained using a training dataset comprising a plurality of fine locations, a plurality of target locations, and a labeled set of directions for each of the plurality of fine locations to each of the plurality of target locations. The machine learning model processes each direction from the labeled set of directions along with a corresponding fine location and a correspond-ing target location. Further, the machine learning model produces a direction as an output for a fine location and a target location outside the training dataset using the pro-cessed training dataset.

In an embodiment, the system may determine the direc-tion towards the next checkpoint or the target location, at each checkpoint. The unmanned vehicle may be directed to move in the direction determined by the system to begin navigation. The unmanned vehicle may need to pass through each checkpoint sequentially before reaching the target location. The system may track the fine location of the unmanned vehicle continuously to ensure completion of each checkpoint in the sequence.

In an embodiment, the system is configured to capture one or more images of at least one of the components and surrounding of the unmanned vehicle based on the inspec-tion instruction. The unmanned vehicle may capture the one or more images while navigation. The one or more images may include at least one of thermal images, depth images, and visible light images. The thermal images capture the infrared radiation emitted by the components, providing information about temperature variations. Hotspots or tem-perature anomalies in solar panels, inverters, or electrical connections may be found in a solar plant using thermal imaging. On the other hand, depth images provide informa-tion about the distance of the components from the sensor device like camera, creating a three-dimensional represen-tation of the scene. In a solar plant, depth images might be helpful in determining the geometry and spatial arrangement of various components. This can help find structural prob-lems, misalignments, or physical abnormalities that aren't always visible in conventional 2D images. Further, the visible light images capture the spectrum of light visible to the human eye, providing detailed visual information about the scene. These images can disclose bodily harm, surface-level defects, and other problems that are readily apparent. Images using visible light offer a traditional visual depiction of the solar plant's components.

In an exemplary embodiment, the unmanned vehicle may capture the one or more images of the components in order to determine defects in the components. The defects may include physical damage, wear and tear, malfunctioning parts, hot spots or any other issues that may affect the efficiency or performance of the solar plant. The defects in the at least one of the components of the solar plant may be detected by analysing the one or more captured images using one or more image processing techniques. Image processing techniques manipulate and enhance images to extract useful information. Various image processing techniques may be employed, such as pattern recognition, filtering, segmenta-tion, and machine learning algorithms, to identify and clas-sify defects.

In an embodiment, to analyse the one or more images, the one or more image processing techniques use a training dataset comprising a plurality of images of a plurality of components annotated with defects in the plurality of com-ponents. For example, a diverse data set of images is collected including images capturing different conditions, perspectives, lighting scenarios, and variations in defect types associated with different components. Each image in the dataset may be annotated with information about a component, location of the component and type of defect. The annotations may include highlights such as bounding boxes around defects, pixel-level segmentation masks, or any other suitable annotation format. If there are several sorts of defects captured in the images, these defects may be divided into distinct classes. Each class may stand for a different kind of abnormality. Each class is identified/rec-ognise by the image processing technique's algorithm. The image processing technique's algorithm may be trained on the annotated dataset to identify defects in the plurality of components.

In an embodiment, the system may generate an inspection report comprising at least one of a detected defect in the one or more components of the solar plant, a defective compo-nent associated with the detected defect in the solar plant and a location of the defective component in the solar plant. For example, after performing an inspection on specified level (e.g., low, medium, or high), as discussed above, the system may generate the inspection report. In an example, the report may include a name or identification of a defective compo-nent like solar panel, type of defect associated with the solar panel, like the solar panel have any cracks or physical damage, hot spot, solar degradation and the like. The report may also include the location of the solar panel in the solar plant, like coordinates of the solar panel. The report may include these details associated with the one or more com-ponents like but not limited to inverters, combiner boxes, wirings, support structures, batteries, mounting structures, and the like. In an embodiment, the system 102 may transmit the inspection report to the user device. In an embodiment, before transmission, the system may convert the format of the inspection report in a format compatible with the user device 104. To safeguard the integrity and confidentiality of the transmitted data, encryption and other security measures may be applied. The inspection report may be displayed on the user device using a graphical user interface. The GUI may consist of various elements such as menus, buttons, text fields, and graphical representations to facilitate user inter-action with the report. The user may interact with the displayed report through the GUI, performing actions such as browsing, searching, filtering, and analysing. In an embodiment, the user device 104 may provide feedback to the system 102 based on the received inspection report.

In an embodiment, the system may be configured to capture the one or more images of the one or more compo-nents or the surroundings, using a sensor positioning mecha-nism. The sensor positioning mechanism controls at least one of the unmanned vehicle and a sensor mount connected to the unmanned vehicle to capture or re capture the one or more images. The sensor positioning mechanism may gov-ern the movement and orientation of the sensor mount, such as camera mounts, mounted on the unmanned vehicle to capture the one or more images. The sensor mount may be controlled remotely and may be compatible with the type of sensor needed for image capturing. In an embodiment, the sensor mount may be controlled by the unmanned vehicle. For example, the sensor mount may include a gimbal for stabilizing a camera or other sensors. The sensor positioning mechanism ensure that the sensor mounts are positioned optimally for capturing the one or more images of solar plant components. For example, the mechanism may be a combination of servo motors and controllers that adjust the angle and orientation of the sensor mounts mounted on the unmanned vehicle. In an embodiment, an adjustable telescope mount may be installed with adjustable height to set it at different levels.

In an embodiment, the sensor positioning mechanism analyses the one or more images captured for inspection to determine a quality of the one or more images. The sensor positioning mechanism may analyse the captured images using a machine learning model trained on a dataset comprising a plurality of inspection instructions, corresponding set of images, and a quality of images from the set of images. For example, the training dataset includes a diverse set of inspection instructions, each linked to a distinct location on the map of the solar plant or a specific solar plant component. The inspection instruction may include information on a specific solar panel or component or the map coordinates of a specific area. Each inspection instruction may be paired with a set of images captured during inspections guided by that instruction. The images may capture a variety of situations, such as changes in weather, lighting, and possible defects on various components. Further the training data set may also include quality assessments for each set of images. The quality assessments may include objective measures, such as resolution, clarity, colour, contrast, sharpness, brightness, noise level, spatial resolution, and the absence of artifacts or distortions. The machine learning algorithm may be trained on a training dataset comprising images of the components taken under different lighting conditions, images at different time of the day, images of components from different angles, images with different blurriness, images with different contrast, images with different zoom in or out levels, images with different focus settings, and the like. The images may be annotated with labels indicating the quality of each component, presence or absence of defects in the components, lighting conditions under which the images were taken, time of day at which images were captured, different viewing angles of components, level of blurriness in the images, zoom level used during images captured, and focus settings used during image captured. This labelled dataset may be used for training the machine learning algorithm. The trained machine learning model may be integrated with the sensor control mechanism on the unmanned vehicle. This integration allows the system to make real-time decisions based on the image quality assessment. As the unmanned vehicle moves through the solar plant, the sensors capture images in real-time. The machine learning model assesses the quality of each image and determines whether potential defects are present.

In an embodiment, the machine learning model may extract the relevant features from the one or more training images. Features may include texture patterns, colour distributions, or shape characteristics of the components. Also, additional features may be extracted from the inspection instruction, such as spatial information or details about the targeted component. By employing supervised learning techniques, the machine learning model may be taught to map features from input data such as images and inspection instructions to perform the appropriate quality determinations. The machine learning model may learn patterns that relate specific image characteristics and inspection instruction details to the perceived quality of the images. The machine learning model may learn to recognize spatial contexts within the solar plant map, understanding how different areas might have distinct image quality expectations. The model may also learn to associate specific components with expected image quality, considering variations in appearance and conditions. In an embodiment, the trained machine learning model may predict the quality of the one or more captured images.

This can be understood with the help of an example, the machine learning model is trained on a dataset that includes inspection instructions related to different areas of a solar plant map and various components, such as solar panels, inverters, etc. The machine learning model identify patterns in images that are linked to either high or low quality depending on the spatial context and feature-specific attributes during training. When a new set of images is captured and input, along with an inspection instruction indicating a specific solar panel, the machine learning model predicts the image quality. It takes into account variables including the local lighting, historical information about related parts, and recognised failure trends. The prediction made by the machine learning model offers important information about how reliable the images that were taken were for identifying defects in that specific situation.

In an embodiment, the machine learning model may assign a score indicating the quality of the one or more images. The machine learning model may assign a score above a threshold score in order to indicate that the quality of an image is acceptable. The threshold score may be a score defined by a user or predicted/predefined by the machine learning model. For example, if the threshold score is 70 and the machine learning model assigns a score of 75 to indicate a quality of an image, this would mean that the quality of the image would be accepted by the system.

In an embodiment, the system may be configured via the sensor positioning mechanism to control at least one of the unmanned vehicles and a sensor mount to re-capture the one or more images captured for inspection based on the quality of the one or more images. In an exemplary embodiment, when the score assigned by the machine learning model may be less than the threshold score, the system may instruct the unmanned vehicle to re-capture the images. For example, if the quality of the image is not satisfactory and a potential defect is suspected on a surface of the solar panel, the sensor positioning mechanism may control the sensor mount by sending one or more instructions to adjust the angle of the sensor mount to re-capture high-resolution images of that surface. These commands may dictate specific changes in the orientation of the sensors to achieve a more focused and targeted view of the identified solar panel. For example, if the unmanned vehicle is not aligned with the potential defect, the system may instruct the unmanned vehicle to change horizontal angle (pan or azimuth) of the sensors. For example, the sensor mount may be instructed to pan to the left or right to align with the potential defect area on the solar panel. In yet another example, if zoom level of the captured pictures are not up to a satisfactory level, the commands may include adjustments to the zoom level of the sensors. This may control the focal length of lenses, allowing the sensors to zoom in or out on a specific area of interest on the solar panel. In yet another embodiment, the commands may include instructions to change focus settings of the sensors, when the captured pictures are not clear and sharp. Adjustments to an aperture size can also be specified to control the amount of light entering the sensors. In another embodiment, to capture a series of images at different angles or zoom levels, the system specifies the timing and sequencing of image captures.

In an embodiment, the system may send instructions or commands to control the unmanned vehicle. The unmanned vehicle may be controlled by controlling at least one of steering the unmanned vehicle and adjusting velocity of the unmanned vehicle based on kinematic data using a guiding technique. In an embodiment, the unmanned vehicle may be equipped with sensors that may record kinematic data, such as acceleration and velocity. The unmanned vehicle may use accelerometers, gyroscopes, GPS receivers, and other motion sensors to record the kinematic data. The kinematic data is obtained by the system for processing and controlling the unmanned vehicle to determine the vehicle's present status, including its speed, direction, and spatial coordinates. In an embodiment, a guiding technique using one or more algorithms may be used to determine the appropriate control actions for the unmanned vehicle. The one or more algorithms may consider the current position of the vehicle and aim to achieve specific objectives, such as following a predefined route, avoiding obstacles, or reaching a target location. In an embodiment, when steering control is selected as a method of control, the algorithm generates commands that adjust the orientation or direction of the unmanned vehicle. This may involve activating steering mechanisms, adjusting the angles of control surfaces (in the case of aerial vehicles), or controlling wheel movements (for ground vehicles). In an embodiment, when adjusting velocity is selected, the algorithm may instruct the unmanned vehicle to control the vehicle's speed. This may involve modifying propulsion systems, adjusting motor speeds, or activating braking mechanisms and the like.

In an embodiment, simultaneously, commands may be sent to the unmanned vehicle to maintain a current position or follow a determined route along with the sensor mount. This coordination ensures that the vehicle provides a stable platform for the sensor mount's adjustments and captures images optimally. In an embodiment, the system may be configured to transfer captured images to the ground control station for further analysis. This may involve automated or manual inspection of the images for defects or anomalies.

In yet another embodiment, a charging level of the unmanned vehicle may also be determined by the system. The system may match the charging level of the unmanned vehicle with a predetermined threshold. The system may perform this matching at a predetermined time or distance covered in the solar plant. The system upon detecting that the charging of the unmanned vehicle is below the threshold, may direct the unmanned vehicle towards a charging station in the solar plant. Once, the charging is completed the system may navigate the unmanned vehicle to the same position and resume the inspection. For example, the system may record position of the robot at the moment of detection of low battery. The position may be saved as pause position and after recharging the robot may be instructed and navigated to the pause position. In an embodiment, the unmanned vehicle may determine if its charging level is below the predetermined threshold. The unmanned vehicle may move towards the charging station and get itself charged. In an embodiment, a fully charged unmanned vehicle is deployed in the solar plant for the inspection. In yet another embodiment, the unmanned vehicle may return to the charging station once the unmanned vehicle detects required defects in the required one or more components.

Figure 4:
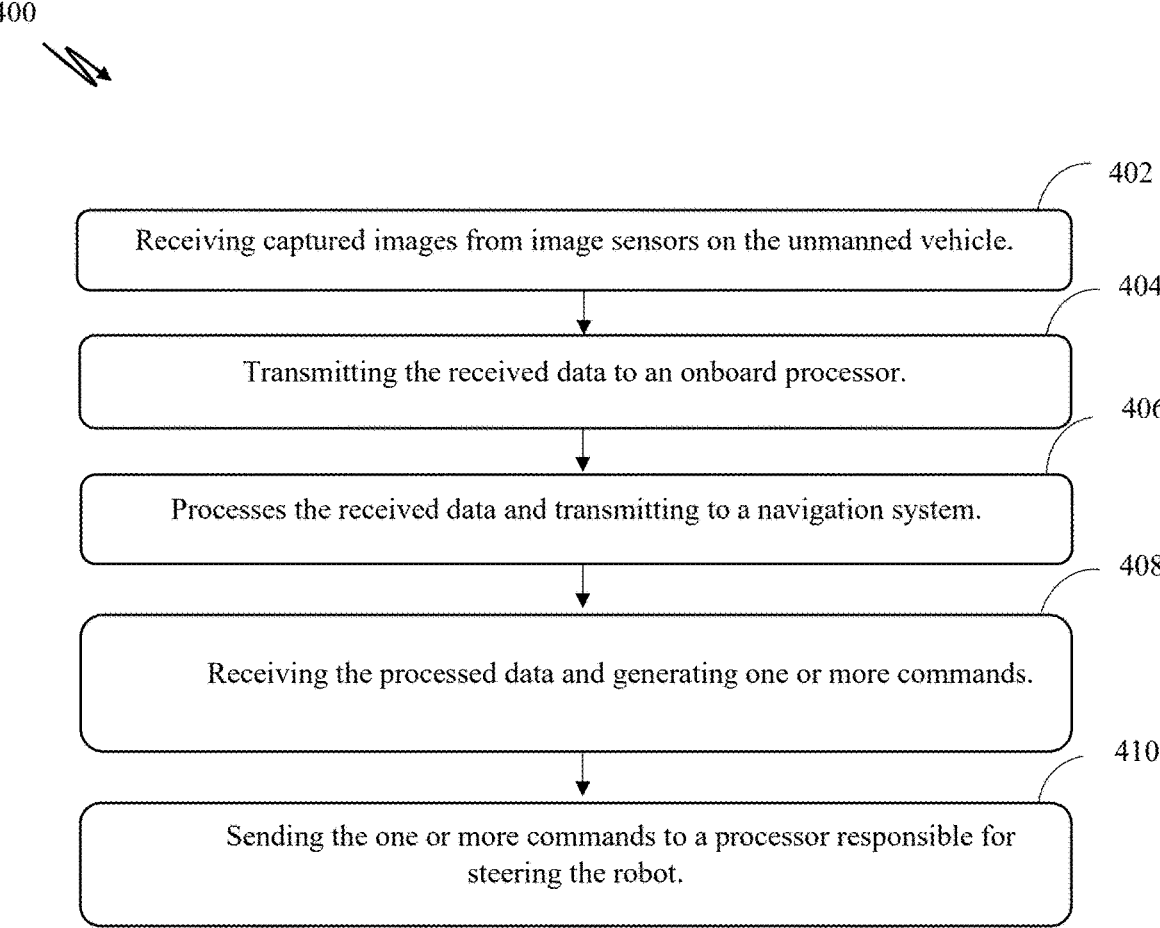
FIG. 4 illustrates a method for navigating an unmanned vehicle in a solar plant, in accordance with an embodiment of the present subject matter.

In an embodiment, refer to FIG. 4, at step 402, the unmanned vehicle receives captured images from image sensors on the unmanned vehicle. The unmanned vehicle may further receive the inspection data and inspection instructions from the system 102 or an administrator entity.

In an embodiment, system may store data comprising the inspection data, the captured images, and the inspection instructions in an onboard memory. The unmanned vehicle may be navigated based on the captured images, inspection instruction, and the inspection data. At step 404, the received data is transmitted to an onboard processor (Central Processing Unit-CPU or Graphics Processing Unit-GPU). The unmanned vehicle may be controlled by the onboard processor. At step 406, The onboard processor processes the received data and transmits processed data to a navigation system. The navigation system may be equipped with algorithms and mapping capabilities, analyses the received processed data to determine the unmanned vehicle's current position and surrounding. At step 408, a control system, interfaced with the navigation system, receives the processed data and generates one or more commands. At step 410, the one or more commands are sent to a processor or microcontroller responsible for steering the robot. The microcontroller interprets the commands and adjusts the unmanned vehicle movements accordingly.

Referring now to FIG. 5, method 500 for navigation of an unmanned vehicle is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types.

The order in which the method 500 is described is not intended to be construed as a limitation, and any number of the described method blocks can be combined in any order to implement the method 500 or alternate methods for navigation of a unmanned vehicle. Furthermore, the method 500 for navigation of a unmanned vehicle can be implemented in any suitable hardware, software, firmware, or combination thereof. However, for ease of explanation, in the embodiments described below, the method 500 may be considered to be implemented in the above-described system 102.

At block 502, inspection data of solar plant is received. The inspection data includes at least one of a map of the solar plant, one or more components of the solar plant, and maintenance history of the solar plant.

At block 504 an inspection instruction is received. The inspection instruction includes information corresponding to at least one of an area in the map of the solar plant, and a component of the one or more components of the solar plant.

At block 506, the unmanned vehicle is navigated based on the inspection instruction and the inspection data. The navigation of the unmanned vehicle is performed by determining a coarse location, fine location, and a route for the navigation.

At block 508, a coarse location of the unmanned vehicle is determined, based on Global Positioning System (GPS) data. The coarse location corresponds to an area of the solar plant in which the unmanned vehicle is present.

At block 510 a fine location of the unmanned vehicle is determined based on image data and the coarse location. The fine location corresponds to position coordinates of the unmanned vehicle in the solar plant. The fine location of the unmanned vehicle is determined by using a machine learning algorithm.

At block 512 a route for the unmanned vehicle is determined based on the fine location, the inspection data, and the inspection instruction.

At block 514 the unmanned vehicle is maneuvered based on the determined fine location of the unmanned vehicle and the route. The unmanned vehicle is at least one of: an automatic vehicle, semi-automatic vehicle, and remote-controlled vehicle.

Exemplary embodiments discussed above may provide certain advantages. Though not required to practice aspects of the disclosure, these advantages may include those provided by the following features.

Some embodiments of the system and the method may help in efficient inspection of the solar plant. The unmanned vehicle can navigate through the solar plant efficiently, covering large areas in a relatively short amount of time.

Some embodiments of the system and the method provide a safer way of inspecting the solar plant. When navigating through complicated and potentially hazardous situations, human inspectors may encounter dangers. Robots can be made to resist such circumstances, guaranteeing the security of the workers and the equipment.

Some embodiments of the system and the method may provide a cost-effective way of inspection. Implementing robotic inspection can be cost-effective in the long run, as it reduces the need for human labor and minimizes downtime in the solar plant.

Some embodiments may provide error free and reliable results. Human mistakes can be minimized by using unmanned vehicle to conduct inspections because they can do them consistently and accurately.

Some embodiments may provide proactive maintenance by doing regular inspections. Any deviations from the expected operating conditions or patterns may be flagged as anomalies. The proactive maintenance strategy involves investigating and addressing these anomalies promptly to prevent them from evolving into critical failures.

Some embodiments of the system and the method enable continuous training and learning of the machine learning algorithms over a period of time to improve the efficiency of the autonomous navigation of the field robot.

Some embodiments of the system and the method provide an efficient way of data collection and analysis. Unmanned vehicles equipped with cameras can capture high-resolution images &/or videos of the solar panels, facilitating detailed defect analysis. These images can be stored and used for historical comparisons to track changes over time.

Although implementations for methods and system for navigation of an unmanned vehicle have been described in language specific to structural features and/or methods, it is to be understood that the appended claims are not necessarily limited to the specific features or methods described. Rather, the specific features and methods are disclosed as examples of implementations for navigation of an unmanned vehicle.

The invention claimed is:

1. A method for navigating an unmanned vehicle in a solar plant, the method comprising:

receiving, by a processor, inspection data of the solar plant, wherein the inspection data includes at least one of a map of the solar plant, one or more components of the solar plant, and maintenance history of the solar plant;

receiving, by the processor, an inspection instruction, wherein the inspection instruction includes information corresponding to at least one of an area in the map of the solar plant and a component from the one or more components of the solar plant; and navigating, by the processor, the unmanned vehicle based on the inspection instruction and the inspection data, wherein the navigating comprises:

determining, by the processor, a coarse location of the unmanned vehicle based on Global Positioning System (GPS) data;

determining, by the processor, a fine location of the unmanned vehicle based on image data and the coarse location;

determining, by the processor, a route for the unmanned vehicle based on the fine location, the inspection data, and the inspection instruction; and manoeuvring, by the processor, the unmanned vehicle based on the fine location of the unmanned vehicle and the determined route.

2. The method as claimed in claim 1, further comprises capturing one or more images of at least one of the one or more components and surrounding of the unmanned vehicle based on the inspection instruction using a sensor positioning mechanism.

3. The method as claimed in claim 2, further comprises detecting defect in the at least one of the one or more components of the solar plant by analysing the one or more images using one or more image processing techniques.

4. The method as claimed in claim 3, further comprises generating an inspection report comprising at least one of the detected defect in one of the one or more components of the solar plant, one or more defective components associated with the detected defect in the solar plant, and corresponding location of the one or more defective components in the solar plant.

5. The method as claimed in claim 2, wherein the sensor positioning mechanism analyses the captured one or more images to determine a quality of the one or more captured images based on a training dataset comprising a plurality of inspection instructions, corresponding set of images, and a quality of images from the set of images.

6. The method of claim 5, wherein the quality of images corresponds to at least one of resolution, clarity, colour, contrast, sharpness, brightness, noise level, and spatial resolution.

7. The method as claimed in claim 5, wherein the sensor positioning mechanism controls at least one of the unmanned vehicle and a sensor mounted on the unmanned vehicle to re-capture one or more images of the one or more components for inspection based on the quality of the one or more images.

8. The method as claimed in claim 2, wherein the one or more images include at least one of thermal images, depth images, and visible light images.

9. The method as claimed in claim 3, wherein the one or more image processing techniques use a training dataset comprising a plurality of images of a plurality of components annotated with defects in the plurality of components.

10. The method as claimed in claim 1, wherein the map of the solar plant includes at least one of a boundary of the solar plant, a label of the one or more components in the solar plant, a location of the one or more components in the solar plant, a driving path in the solar plant, an obstacle in the solar plant.

11. The method as claimed in claim 1, wherein the inspection instruction comprises a level of inspection, and wherein the level of inspection is one of a low inspection, a medium inspection and a high inspection.

12. The method as claimed in claim 1, wherein the fine location is determined using a machine learning model, and wherein the machine learning model is trained to detect one or more components surrounding the unmanned vehicle based on the inspection instruction and image data of the one or more components surrounding the unmanned vehicle.

13. The method as claimed in claim 9, wherein the route for the unmanned vehicle comprises one or more check-points through the driving path in the solar plant, and wherein the route begins from the fine location of the unmanned vehicle and ends at a location determined based on the inspection instruction.

14. The method as claimed in claim 6, wherein controlling the unmanned vehicle comprises at least one of steering the unmanned vehicle and adjusting velocity of the unmanned vehicle based on kinematic data using a guiding technique.

15. The method as claimed in claim 1, wherein the unmanned vehicle is a ground based rover.

16. The method as claimed in claim 1, wherein the coarse location corresponds to an area of the solar plant in which the unmanned vehicle is present.

17. The method as claimed in claim 1, wherein the fine location corresponds to position coordinates of the unmanned vehicle in the solar plant.

18. The method as claimed in claim 1, wherein the image data includes one or more images of surrounding of the unmanned vehicle.

19. The method of claim 1, wherein the unmanned vehicle is at least one of: an automatic vehicle, semi-automatic vehicle, and remote-controlled vehicle.

20. A system for navigating an unmanned vehicle in a solar plant, comprising:

a memory storing one or more instructions;

a processor communicatively coupled to the memory, wherein the one or more instructions upon execution causes the processor to:

receive inspection data of the solar plant, wherein the inspection data includes at least one of a map of the solar plant, one or more components of the solar plant, and maintenance history of the solar plant;

receive an inspection instruction, wherein the inspection instruction includes information corresponding to at least one of an area in the map of the solar plant and a component from the one or more components of the solar plant; and navigate the unmanned vehicle based on the inspection instruction and the inspection data, wherein the navigating comprises:

determine a coarse location of the unmanned vehicle based on Global Positioning System (GPS) data;

determine fine location of the unmanned vehicle based on image data and the coarse location;

determine a route for the unmanned vehicle based on the fine location, the inspection data, and the inspection instruction; and manoeuvre the unmanned vehicle based on the fine location of the unmanned vehicle and the determined route.

* * * * *